US012793580B2

(12) United States Patent
Zan et al.

(10) Patent No.: US 12,793,580 B2
(45) Date of Patent: Nov. 10, 2026

(54) REDUCED-SCALE MODEL EXPERIMENTAL DEVICE OF COUPLING RESPONSES IN DEEP-WATER J-LAY OPERATION AND EXPERIMENTAL METHOD

(71) Applicant: HARBIN ENGINEERING UNIVERSITY, Harbin (CN)

(72) Inventors: Yingfei Zan, Harbin (CN); Kuo Huang, Harbin (CN); Duanfeng Han, Harbin (CN); Lihao Yuan, Harbin (CN); Tianbao Ding, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 487 days.

(21) Appl. No.: 18/489,038

(22) Filed: Oct. 18, 2023

(65) Prior Publication Data

US 2024/0290226 A1 Aug. 29, 2024

(51) Int. Cl.
*G09B 25/02* (2006.01)

(52) U.S. Cl.
CPC .................................... *G09B 25/02* (2013.01)

(58) Field of Classification Search
CPC ...................................................... G09B 25/02
See application file for complete search history.

(56) References Cited

FOREIGN PATENT DOCUMENTS

GB 2549102 A * 10/2017 ............. E21B 43/01

* cited by examiner

*Primary Examiner* — Kesha Frisby
(74) *Attorney, Agent, or Firm* — CBM PATENT CONSULTING, LLC

(57) ABSTRACT

A reduced-scale model experimental device of coupling responses in deep-water J-lay operation is used for studying a coupling response characteristic of a pipeline and a pipe-laying ship in the deep-water J-lay operation under a wave load, a pipe-laying ship model is connected to a center of an adjustable horizontal mooring mechanism, a deep-water pipeline model mainly comprises a polypropylene pipe and stainless steel powder filled in an interior of the polypropylene pipe, two ends of the deep-water pipeline model are respectively connected with the pipe-laying ship model and a seabed simulation mechanism through a pipeline departure angle control mechanism and an anchor end connection mechanism, the device fully ensures a mechanical similarity between the pipeline model and a real pipeline.

8 Claims, 7 Drawing Sheets

REDUCED-SCALE MODEL EXPERIMENTAL DEVICE OF COUPLING RESPONSES IN DEEP-WATER J-LAY OPERATION AND EXPERIMENTAL METHOD

CROSS-REFERENCE TO RELATED APPLICATIONS

This application claims priority to Chinese Patent Application Ser. No. CN202310172887.1 filed on 27 Feb. 2023.

TECHNICAL FIELD

The present invention belongs to the technical field of submarine pipeline laying experiments, and particularly relates to a reduced-scale model experimental device of coupling responses in deep-water J-lay operation and an experimental method.

BACKGROUND

A J-lay method, as a novel pipe-laying technology rising since 1980s, is considered to be the most suitable method for deep-water and ultra-deep-water pipe laying. It is impossible for a pipe-laying ship to be in a static state when being subjected to a combined action of external environmental forces such as wind, waves and currents in offshore operation, and motions of the pipe-laying ship in horizontal and vertical directions both have an influence on a pipeline, and may change the form of the pipeline and the stress and strain distribution of the pipeline. In addition, because the pipeline is lowered into deep sea at an almost vertical angle in the J-lay operation, the pipeline is turned from a nearly vertical state on the moving pipe-laying ship into a horizontal placement state on a seabed, which may form a large radius of curvature, and a bending moment on the pipeline can be increased sharply near a touch-down point of the pipeline. Correspondingly, the existence of the pipeline may also have an influence on the motions of the pipe-laying ship and the morphology of the seabed. Therefore, it is of great theoretical value and scientific significance to study a coupling dynamic characteristic of the pipe-laying ship, the pipeline and the seabed.

A water tank model experiment plays an irreplaceable important role because the water tank model experiment can fully restore actual operation responses of structure under limited funds and site conditions, and can provide verification basis for numerical simulation. However, existing model experiments for underwater pipelines only study a static response, without considering influences of a hydrodynamic force, the motions of the pipe-laying ship and an environmental load; or only impose a forced motion on a pipeline model without considering a coupling effect of the pipeline, the pipe-laying ship and the seabed; or choose to ignore influences of a bending stiffness and even an axial stiffness of the pipeline to manufacture the simplified pipeline model, without fully considering a structural similarity between the pipeline model and a real pipeline; or choose to sacrifice the integrity of the model and improve a scale ratio by cut-off pipeline model experiments. Therefore, in order to study the coupling response characteristic of the pipeline and the pipe-laying ship in the deep-water J-lay operation under a wave load, and improve the accuracy and credibility of experimental results at the same time, it is necessary to design a set of experimental device and method for coupling responses in the deep-water J-lay operation, which can fully ensure the coupling effect of the pipe-laying ship model—the pipeline model—the seabed model under the wave load, accurately consider the similarity between the pipeline model and the real pipeline, and ensure the integrity of the experimental model.

SUMMARY

The present invention is intended to: aiming at the technical detects in the prior art, provide a reduced-scale model experimental device of coupling responses in deep-water J-lay operation and an experimental method, which can truly reflect a coupling dynamic response characteristic of a pipe-laying ship-a pipeline-a seabed in the deep-water J-lay operation under a wave load, and accurately measure and record tension changes at two ends of the pipeline, a motion near a touch-down point and a six-degree-of-freedom motion response of the pipe-laying ship during a whole experimental process.

A technical solution used to achieve the object of the present invention is as follows.

A reduced-scale model experimental device of coupling responses in deep-water J-lay operation comprises a pipe-laying ship model (1), a horizontal mooring mechanism, a deep-water pipeline model (17), a pipeline departure angle control mechanism, an anchor end connection mechanism and a seabed simulation mechanism. The horizontal mooring mechanism comprises four horizontal mooring lines formed by sequentially connecting the same thin steel wire (3), spring (4) and nylon cord (5), four corresponding mooring line adjustment units and four mooring line tension sensors (6); the thin steel wires are connected with four corners of side walls of the pipe-laying ship model through the mooring line tension sensors, and the nylon cords are connected with the mooring line adjustment units; the mooring line adjustment units are mounted on sliding rails (30) at a top end of a water tank side wall (31), capable of moving horizontally or being fixed along the sliding rails, and used for adjusting lengths and tail end positions of the mooring lines, thus adjusting pre-tensions of the mooring lines and a position and a heading of the pipe-laying ship model in a water tank; the pipe-laying ship model floats on a water surface (32), a six-degree-of-freedom motion sensor (2) is mounted on an upper surface of the pipe-laying ship model, and the seabed simulation mechanism is capable of being stably located at a water tank bottom (29) under a gravity; the deep-water pipeline model (17) comprises a polypropylene pipe and stainless steel powder in an interior of the polypropylene pipe, a natural form of the deep-water pipeline model is a straight thin cylinder, a top end and a bottom end of the deep-water pipeline model are respectively connected with the pipe-laying ship model and the seabed simulation mechanism through the pipeline departure angle control mechanism and the anchor end connection mechanism after mounting, the pipeline model naturally bends under the gravity, and a touch-down zone of the deep-water pipeline model is laid on the seabed simulation mechanism, wherein a part near a touch-down point is marked with a yellow fluorescent sticker (18); and the pipeline departure angle control mechanism is fixedly connected on a longitudinal section below the pipe-laying ship model and capable of adjusting an included angle between a top end of the pipeline and the pipe-laying ship.

The mooring line adjustment unit comprises a main body (7), a pulley (9), a brake (10) and a winch (8), and the pulley keeps in contact with the sliding rail (30); the nylon cord (5) is capable of being wound on the winch, and retracted and released by rotating the winch; and the brake is capable of fixing the mooring line adjustment unit on the sliding rail and fixing the winch.

The deep-water pipeline model comprises several sections of polypropylene pipe (1701) with the same aperture size and wall thickness, micro-spherical stainless steel powder (1702), a polypropylene pipe orifice plug (1703) and a polypropylene connection sleeve (1704). The aperture size and the wall thickness of the pipe are determined according to calculation results of similarity criteria, the stainless steel powder is fully filled in an interior of each section of polypropylene pipe, and the polypropylene pipe orifice plugs are used to tightly plug two ends of the pipe by hot-melting and fixed to ensure a water tightness of the interior of each section of pipe, thus forming several pipe sections; various pipe sections are hot-melted with the connection sleeve at a joint in a head-tail coaxial way to form an integral pipeline model; and the pipe orifice plugs at top and bottom ends of the pipeline model need to protrude from a cross section of the pipe, so as to be matched with the pipeline departure angle control mechanism and the anchor end connection mechanism respectively, and convenient for disassembly, assembly and replacement.

The pipeline departure angle control mechanism comprises a base (11), a rocker (13), a connecting rod (12), a pull rod motor (14), a top end tension sensor (15) and a pipeline top end sleeve (16). The base is fixed on the pipe-laying ship model and fixedly connected with the push rod motor; an upper end of the rocker is hinged with the base, a lower end of the rocker is fixedly connected with the tension sensor, and a sliding groove is arranged in a middle of the rocker; the connecting rod (12) is L-shaped, one end of the connecting rod is inserted into the sliding groove of the rocker (13), and the other end of the connecting rod is fixedly connected with a push rod of the push rod motor (14); and an upper end of the pipeline top end sleeve (16) is coaxially and fixedly connected with the tension sensor (15), and a lower end of the pipeline top end sleeve is fixedly connected with a top end of the pipeline model (17). The push rod motor may be remotely controlled to drive the connecting rod to make a linear motion, thus driving the rocker to swing and driving the top end of the pipeline model to rotate to a specific angle. The seabed simulation mechanism comprises a main frame (24), a bottom plate (22), a seabed model (23), a camera frame (25), an underwater high-definition binocular camera (26), a counterweight (28) and a pull rope (27). The bottom plate (22) is fixed at a bottom portion of the main frame (24) and contacts with the water tank bottom (29), and the seabed model (23) is laid on an upper surface of the bottom plate and contacts with the touch-down zone of the pipeline model; the camera frame is mounted on the main frame and capable of sliding in a length direction of the bottom plate to adjust a position; the underwater high-definition binocular camera is fixed on the camera frame, and an angle and a position of the underwater high-definition binocular camera may be adjusted; four counterweights are provided and respectively fixed on outer sides of four corners of a bottom portion of the main frame; and four pull ropes are provided, and lower ends of the pull ropes are respectively connected with the main frame.

The anchor end connection mechanism comprises a universal joint coupler (21), an underwater tension sensor (20) and a pipeline bottom end sleeve (19) which are coaxially connected in series in sequence; and the universal joint coupler (21) is mounted at a midpoint of a tail end of the upper surface of the bottom plate (22) of the seabed simulation mechanism, and the pipeline bottom end sleeve is coaxially and fixedly connected with the bottom end of the pipeline model (17).

An experimental method of the reduced-scale model experimental device of the coupling responses in the deep-water J-lay operation according to claim 1 comprises the following steps of:

first step: arrangement of above-water part: moving the pipe-laying ship model into the water tank to be connected with the horizontal mooring mechanism, respectively controlling four mooring line adjustment units to gradually tighten the mooring lines after the pipe-laying ship model is stable until the pipe-laying ship model moves to specified coordinates and the mooring line tension sensors read specified pre-tensions after being stable, and calibrating a motion coordinate system of the pipe-laying ship model through the six-degree-of-freedom motion sensor;

second step: carrying out of pipe-laying ship motion experiment: making waves in the water tank after the above-water part is arranged and still water is restored, and recording a six-degree-of-freedom motion of the pipe-laying ship model and tension changes of four mooring lines; and respectively making various preset groups of regular waves with different wave height and period combinations and irregular waves with different significant wave height and spectral peak period combinations in sequence, and comparing system dynamic responses under different sea conditions;

third step: arrangement of underwater part: after all experimental conditions of the pipe-laying ship motion experiment are finished, on the premise of keeping the position of the pipe-laying ship model and the tensions of the mooring lines unchanged, connecting the pipeline model with the pipe-laying ship model and the seabed simulation mechanism respectively through the pipeline departure angle control mechanism and the anchor end connection mechanism, lowering the seabed simulation mechanism to a specific position on the water tank bottom and adjusting a posture of the seabed simulation mechanism through the pull ropes, and adjusting a pipeline top end departure angle by remotely controlling the pipeline departure angle control mechanism, so as to ensure that the pipeline top end tension sensor and the pipeline bottom end tension sensor read predetermined values after the system is stable, wherein the pipeline model is ensured to be not subjected to structural damages such as yield, fracture and plastic deformation in the process;

fourth step: carrying out of coupling response experiment: after the underwater part is arranged and still water is restored, making waves in the water tank, recording the six-degree-of-freedom motion of the pipe-laying ship model, the tension changes of four mooring lines, and tension changes of top and bottom ends of the pipeline model under a full coupling condition, and acquiring a motion condition of a marked point near the touch-down point of the pipeline model within an underwater camera shooting range by an image recognition technology; and respectively making regular waves and irregular waves with the same parameters as those in the second step in sequence, and comparing coupling system dynamic responses under different sea conditions;

fifth step: changing the pipeline top end departure angle to other preset angles through the pipeline departure angle control mechanism, and repeating the fourth step to simulate the coupling system dynamic responses under different pipeline departure angles; and sixth step: adjusting a wave-approach direction of the pipe-laying ship model to other preset angles through the mooring line adjustment unit, and repeating the first step to the fifth step to simulate the system dynamic responses under different wave-approach directions.

Compared with the prior art, the present invention has the beneficial effects that:

(1) a mechanical similarity between the pipeline model and the real pipeline is fully ensured, and influences of a bending stiffness and an axial stiffness of the pipeline on a response are fully considered, thus improving the accuracy and credibility of experimental results;

(2) a coupling effect of the pipe-laying ship model—the pipeline model—the seabed model is fully ensured, and a coupling dynamic response characteristic of the pipe-laying ship—the pipeline—the seabed in the deep-water J-lay operation under the wave load can be truly reflected; and (3) Parameters such as an departure angle of the pipeline and a wave-approach direction angle of the model can be accurately and quickly adjusted, experimental efficiency is improved, and data support is provided for practical engineering.

Figure 1:
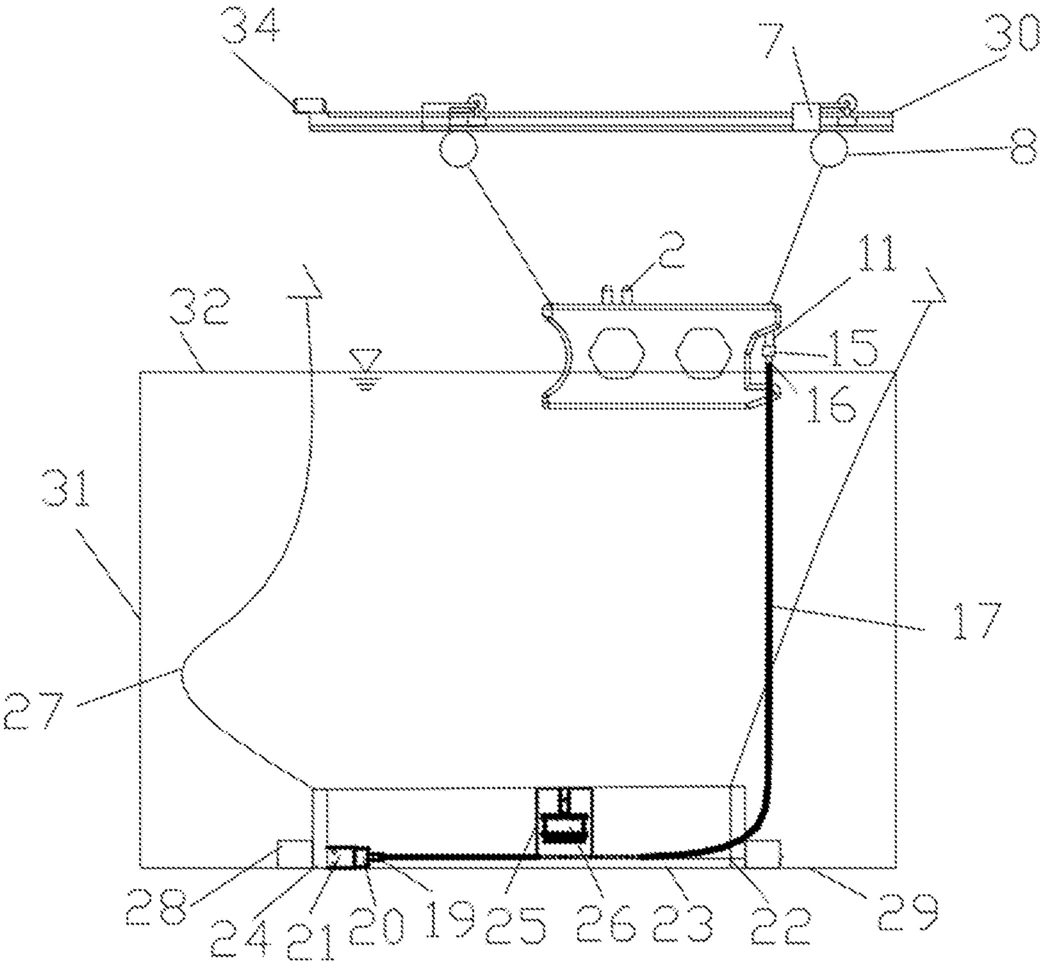
FIG. 1 is a schematic structural diagram of a reduced-scale model experimental device of coupling responses in deep-water J-lay operation according to the present invention.
Figure 2:
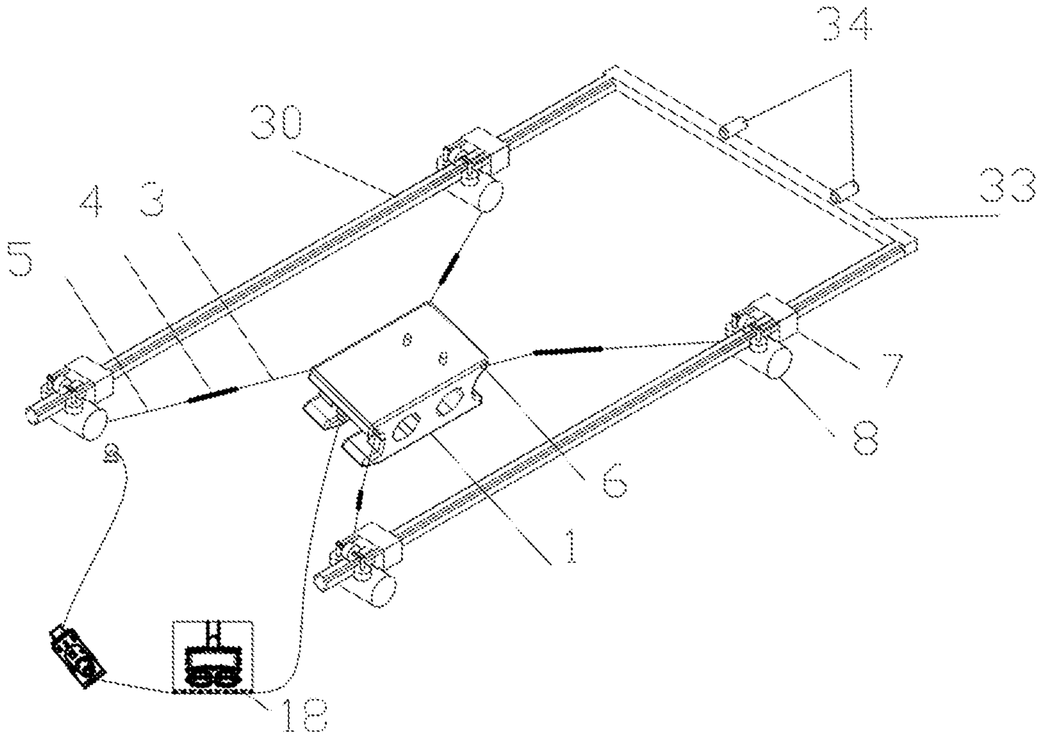
FIG. 2 is a schematic diagram of mounting of a horizontal mooring mechanism and a pipe-laying ship model in the present invention.
Figure 3:
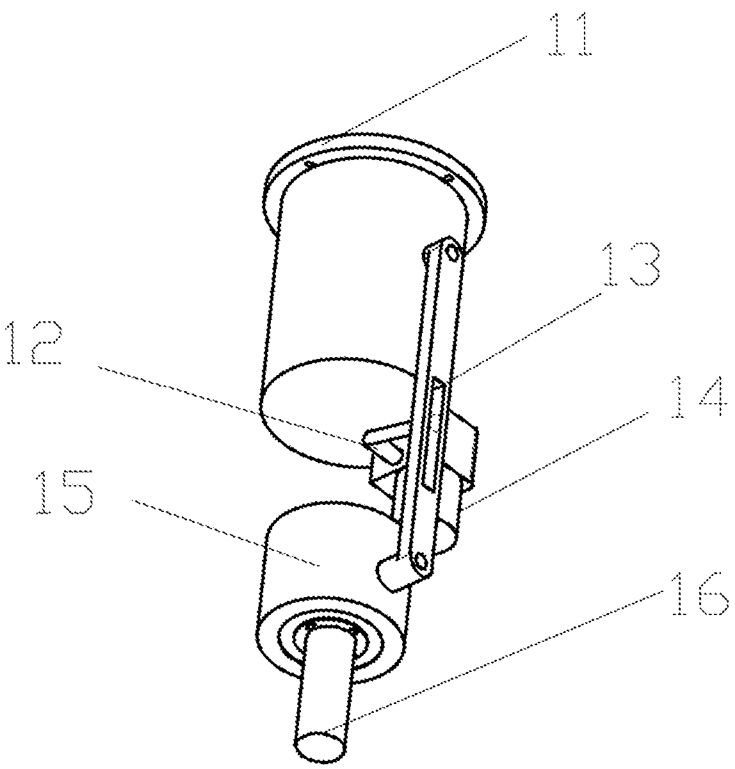
FIG. 3 is a schematic structural diagram of a pipeline departure angle control mechanism in the present invention.
Figure 4:
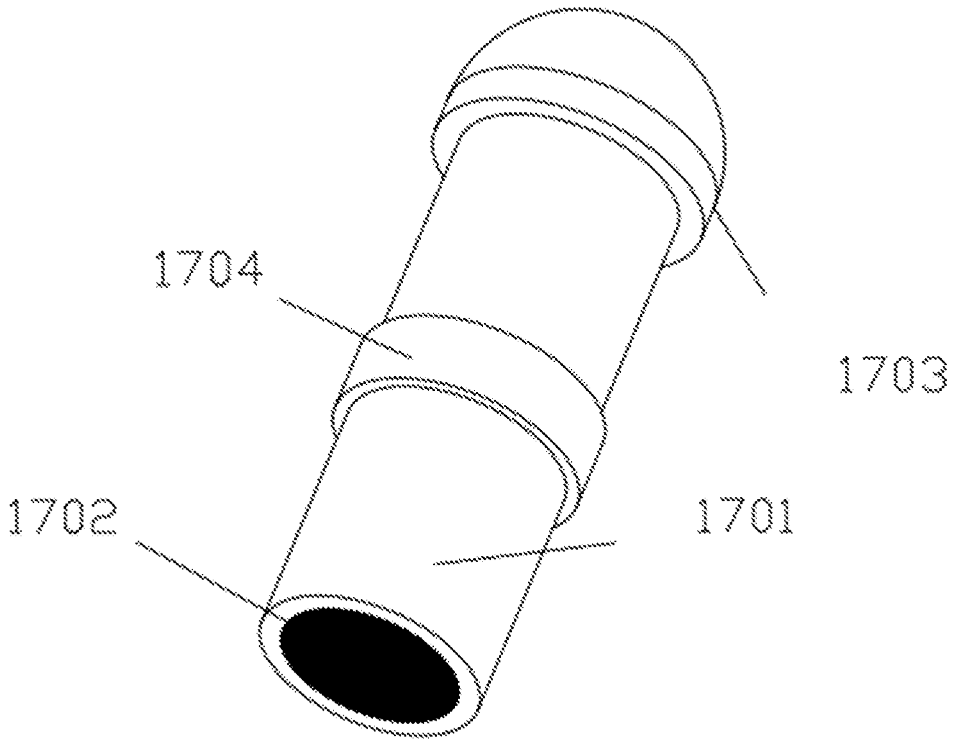
FIG. 4 is a schematic structural diagram of a deep-water pipeline model in the present invention.
Figure 5:
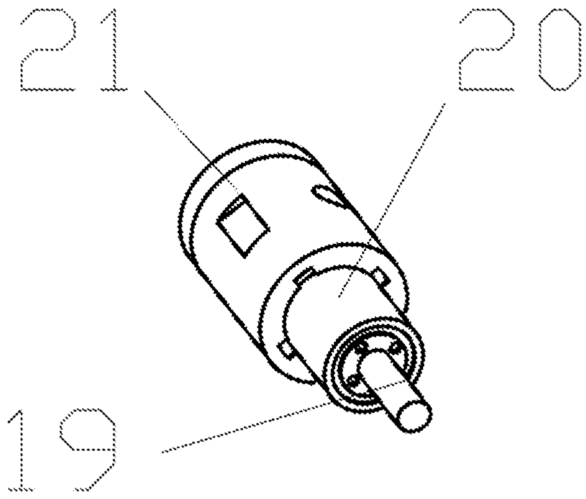
FIG. 5 is a schematic diagram of an anchor end connection mechanism in the present invention.
Figure 6:
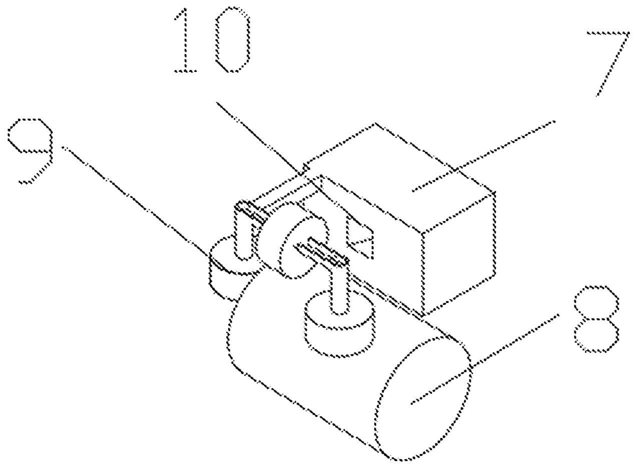
FIG. 6 is a schematic structural diagram of a mooring line adjustment unit in the present invention.

In the drawings, 1 refers to pipe-laying ship model, 2 refers to six-degree-of-freedom motion sensor, 3 refers to steel wire, 4 refers to spring, 5 refers to nylon cord, 6 refers to mooring line tension sensor, 7 refers to main body, 8 refers to winch, 9 refers to pulley, 10 refers to brake, 11 refers to base, 12 refers to connecting rod, 13 refers to rocker, 14 refers to push rod motor, 15 refers to top end tension sensor, 16 refers to pipeline top end sleeve, 17 refers to deep-water pipeline model, 1701 refers to polypropylene pipe, 1702 refers to micro-spherical stainless steel powder, 1703 refers to polypropylene pipe orifice plug, 1704 refers to polypropylene connection sleeve, 18 refers to marking sticker, 19 refers to pipeline bottom end sleeve, 20 refers to underwater tension sensor, 21 refers to universal joint coupler, 22 refers to bottom plate, 23 refers to seabed model, 24 refers to main frame, 25 refers to camera frame, 26 refers to underwater high-definition binocular camera, 27 refers to pull rope, 28 refers to counterweight, 29 refers to water tank bottom, 30 refers to sliding rail, 31 refers to water tank side wall, 32 refers to water surface, 33 refers to trailer frame, and 34 refers to six-degree-of-freedom motion signal receiver.

DETAILED DESCRIPTION

The present invention is further described in detail hereinafter with reference to the drawings and embodiments.

In order to make the above objects, features and advantages of the present application clearer and more understandable, specific embodiments of the present application are described in detail hereinafter with reference to the drawings. In the following description, many specific details are explained so as to fully understand the present application. However, the present application can be implemented in many other ways different from those described herein, and those skilled in the art can make similar improvements without violating the connotation of the present application, so that the present application is not limited by the specific embodiments disclosed below.

Unless otherwise defined, all technical and scientific terms used herein have the same meanings as those commonly understood by those skilled in the technical field of the present application. The terms used in the specification of the present application herein are only for the purpose of describing the specific embodiments, and are not intended to limit the present application. In the description of the embodiments of the present invention, it should be understood that the terms "connected" and "linked" both comprise direct and indirect connections unless otherwise specified.

In the description of the embodiments of the present invention, it should be understood that the orientation or position relationship indicated by the terms "center", "up", "down", "front", "rear", "left", "right", "vertical", "horizontal", "top", "bottom", "inside", "outside", "clockwise", "counterclockwise", and the like is based on the orientation or position relationship shown in the drawings, it is only for the convenience of description of the present invention and simplification of the description, and it is not to indicate or imply that the indicated device or element must have a specific orientation, and be constructed and operated in a specific orientation. Therefore, the terms should not be understood as limiting the present invention.

FIRST EMBODIMENT

As shown in FIG. 1 to FIG. 6, a reduced-scale model experimental device of coupling responses in deep-water J-lay operation comprises a water tank, a seabed simulation mechanism, a deep-water pipeline model 17, a horizontal mooring mechanism, a pipeline departure angle control mechanism and an anchor end connection mechanism.

A U-shaped trailer frame 33 is mounted above a water tank, two sliding rails 30 are mounted on two sides of the trailer frame 33 in parallel, and a six-degree-of-freedom motion signal receiver 34 is mounted at one end of the trailer frame 33.

A pipe-laying ship model 1 floats on a water surface 32 of the water tank, the horizontal mooring mechanism positions the pipe-laying ship model 1 in a center of the water tank, and a six-degree-of-freedom motion sensor 2 corresponding to the six-degree-of-freedom motion signal receiver 34 is mounted on an upper surface of the pipe-laying ship model 1. The six-degree-of-freedom motion sensor 2 is specifically an optical signal transmitter, which needs to be used in cooperation with the six-degree-of-freedom motion signal receiver 34 mounted on the trailer frame 33, and may monitor and record six-degree-of-freedom motion data of the pipe-laying ship model 1 in real time. Before starting a formal experiment, it is necessary to carry out a free decay test and an incline test on the pipe-laying ship model 1 in advance, and data such as a center of gravity, an inertia radius and a damping coefficient are adjusted to be identical to design values by arranging a counterweight (different from the counterweight 28 in FIG. 1) in an interior or on a surface of a ship body.

The seabed simulation mechanism is located on a bottom surface of an interior of the water tank. The seabed simulation mechanism comprises a main frame 24, a bottom plate 22, a seabed model 23, a camera frame 25, an underwater high-definition binocular camera 26, a counterweight 28 and a pull rope 27.

The bottom plate 22 is a rectangular flat plate and surrounded by a rectangular frame at a bottom portion of the main frame 24, and a bottom surface of the bottom plate 22 abuts against the bottom surface of the interior of the water tank.

The seabed model 23 is laid on an upper surface of the bottom plate 22, and the seabed model 23 is contacted with a touch-down zone of the deep-water pipeline model.

The camera frame 25 is mounted on the main frame 24 and capable of sliding in a length direction of the bottom plate 22.

The underwater high-definition binocular camera 26 is mounted on the camera frame 25, and on a beam at a top end of the camera frame 25, and an angle and a position of the underwater high-definition binocular camera may be adjusted, so as to ensure that motions of several marking points in front of and behind a touch-down point of the pipeline model can be photographed.

Four counterweights 28 are provided, and the four counterweights 28 are respectively mounted on positions on outer sides of four corners of a bottom portion of the main frame 24, thus playing a role in stabilizing the seabed simulation mechanism.

Four pull ropes 27 are provided, lower ends of the four pull ropes 27 are respectively connected with the four corners of the main frame 24, and upper ends of the four pull ropes 27 are located outside the water tank, thus being used for adjusting a position of the seabed simulation mechanism at a water tank bottom 29.

The pipeline departure angle control mechanism for adjusting an included angle between a top end of the deep-water pipeline model 17 and the pipe-laying ship model 1 is mounted between the top end of the deep-water pipeline model 17 and the pipe-laying ship model 1, and a bottom end of the deep-water pipeline model 17 is connected with the seabed simulation mechanism through the anchor end connection mechanism. The deep-water pipeline model 17 naturally bends into a J shape under a gravity, the touch-down zone of the deep-water pipeline model 17 is laid on the seabed simulation mechanism, and a yellow fluorescent sticker with a width approximately equal to a diameter of the pipeline model is mounted on a nearby part of the touch-down point, so as to subsequently carry out target recognition and image processing to acquire a motion of the pipeline model in the experiment.

The horizontal mooring mechanism comprises four sets of horizontal mooring assemblies. The four sets of horizontal mooring assemblies are respectively connected to four corners of the pipe-laying ship model 1. Each set of horizontal mooring assemblies comprises a horizontal mooring line, a mooring line adjustment unit and a mooring line tension sensor 6. Four horizontal mooring lines have an adjustable length and completely identical properties.

Various mooring line adjustment units are horizontally movably mounted on corresponding sliding rails 30. When various mooring line adjustment units move on the corresponding sliding rails 30, lengths and tail end positions of the horizontal mooring lines are changed, thus adjusting pre-tensions of the mooring lines and a wave-approach angle of the pipe-laying ship model 1 in the water tank.

Specifically, the horizontal mooring line is formed by sequentially connecting a steel wire 3, a spring 4 and a nylon cord 5. Geometric dimensions and masses of various parts are all measured, and a stiffness of the spring 4 is measured by a tensile test in advance. The steel wire 3 is a thin steel wire 3, one ends of various steel wires 3 are connected with four corners of side walls of the pipe-laying ship model 1 through corresponding mooring line tension sensors 6, and the mooring line tension sensors 6 are used for measuring a tension exerted by each horizontal mooring line on the pipe-laying ship model 1 in real time. The other ends of various steel wires 3 are connected with one ends of corresponding springs 4. The other ends of various springs 4 are connected with one ends of corresponding nylon cords 5. The other ends of various nylon cords 5 are connected with corresponding mooring line adjustment units, and a length of the nylon cord 5 has a margin.

The anchor end connection mechanism comprises a universal joint coupler 21, an underwater tension sensor 20 and a pipeline bottom end sleeve 19 which are coaxially connected in series in sequence. The universal joint coupler 21 is mounted at a midpoint of a tail end of the upper surface of the bottom plate 22. The underwater tension sensor 20 needs to be able to maintain water tightness and high accuracy at an experimental water depth for a long time, the pipeline bottom end sleeve 19 is a light cylindrical member, and the pipeline bottom end sleeve 19 is coaxially and fixedly connected with the bottom end of the deep-water pipeline model 17.

Data of all the above sensors are collected synchronously in real time and processed by a data acquisition computer.

SECOND EMBODIMENT

Based on First Embodiment, the present invention aims to realize a function of adjusting an included angle between the top end of the deep-water pipeline model 17 and the pipe-laying ship model 1, and the pipeline departure angle control mechanism comprises a base 11, a rocker 13, a connecting rod 12, a top end tension sensor 15 and a pipeline top end sleeve 16.

The pipeline departure angle control mechanism is mounted on a lower surface of a position wherein the pipe-laying ship model 1 and a J-lay tower (the J-lay tower is a structure on the pipe-laying ship, a top end point of the deep-water pipeline model corresponds to a position on the pipe-laying ship where the J-lay tower is located, and the structure is not shown in the schematic diagram) are located for simulating a function of the J-lay tower in actual operation.

The base 11 is cylindrical, a top end of the base 11 is mounted on the pipe-laying ship model 1, and a push rod motor 14 is mounted at a bottom end of the base 11.

An upper end of the rocker 13 is hinged with a side wall of the base 11, the tension sensor 6 is mounted at a lower end of the rocker 13, and a strip-shaped hollow sliding groove is arranged in the middle of the rocker 13. The connecting rod 12 is L-shaped, one end of the connecting rod 12 is movably arranged in the sliding groove of the rocker 13 in a length direction of the sliding groove, and the other end of the connecting rod 12 is connected with a push rod of the push rod motor 14.

The pipeline top end sleeve 16 is a light cylindrical member, an upper end of the pipeline top end sleeve 16 is coaxially connected with the tension sensor 6, a lower end of the pipeline top end sleeve 16 is connected with a top end of the deep-water pipeline model 17, and an axial tension change at the top end of the pipeline model can be collected in real time through the pipeline end tension sensor 6. In an actual experiment, the push rod of the push rod motor 14 may be remotely controlled to extend and retract for a specified length to drive the connecting rod 12 fixedly connected with the push rod motor to make a horizontal linear motion, the rocker 13 swings around a side wall of the base 11, and the top end of the pipeline model is driven to rotate to a predetermined laying angle through the tension sensor 6 and the pipeline top end sleeve 16, thus adjusting the included angle between the top end of the deep-water pipeline model 17 and the pipe-laying ship model 1.

THIRD EMBODIMENT

Based on Second Embodiment, the present invention aims to realize a function of adjusting pre-tensions of the mooring lines or changing a wave-approach angle of the pipe-laying ship model 1 in the water tank, the mooring line adjustment unit comprises a main body 7, and three pulleys 9 are mounted on one side of the main body 7. The three pulleys 9 are respectively contacted with an upper surface and two side surfaces of the sliding rail 30.

A brake 10 for fixing the main body 7 and a winch 8 for retracting and releasing the nylon cord 5 are respectively mounted on one side of the main body 7.

The nylon cord 55 may be wound on the winch 8, and is retracted and released by rotating the winch 8. When the mooring line adjustment unit reaches a target position on the sliding rail 30, the mooring line adjustment unit may be fixed on the current position through the brake 10, and the winch 8 is fixed at the same time.

A static water horizontal offset test is carried out on the mooring mechanism and the pipe-laying ship model 1 which are connected to measure a horizontal stiffness of a mooring system.

The deep-water pipeline model 17 comprises a polypropylene pipe 1701, and an interior of the polypropylene pipe 1701 is fully filled with micro-spherical stainless steel powder 1702. Before the experiment, an elastic modulus of a polypropylene material is measured by a material mechanics experiment in advance, a density of the polypropylene material and a stacking density of the stainless steel powder 1702 are measured, and then an aperture size and a wall thickness of the polypropylene pipe 1701 are determined according to calculation results of similarity criteria. The polypropylene pipe 1701 is a straight cylinder. Two ends of the polypropylene pipe 1701 are respectively plugged through polypropylene pipe orifice plugs 1703 by hot-melting.

In the embodiment, an experimental water depth is small, and a length of the pipeline model is relatively short, so that it is not necessary to manufacture a plurality of pipe sections and connect the pipe sections, but only one section of pipe with a length equal to a length of the pipeline model is needed and an interior of the pipe is fully filled with the stainless steel powder 1702, and the pipe orifice plugs 1703 are mounted at two ends of the pipe.

FOURTH EMBODIMENT

Based on Third Embodiment, in order to realize an experiment of a long-distance pipeline, a polypropylene connection sleeve 1704 is further provided. A plurality of polypropylene pipes 1701 are provided. Various polypropylene pipes 1701 are coaxially connected, and a corresponding connection sleeve 1704 is mounted at a joint of two polypropylene pipes 1701 by hot-melting.

Because the pipeline model in the embodiment is more than ten meters long, in order to be convenient for filling and manufacturing the model and ensure that the pipeline model used in the experiment is in a straight state without plastic deformation, the polypropylene pipe 1701 is divided into three sections with a small length for transportation and storage, and a sum of the lengths of the three sections is equal to a total length of the pipeline model. When the deep-water pipeline model is manufactured, the stainless steel powder 1702 is fully filled in an interior of each section of polypropylene pipe 1701, and two polypropylene pipe orifice plugs 1703 are used to plug two ends of the pipe by hot-melting and fixed, so as to ensure a water tightness of the interior of each section of pipe and form the three pipe sections. Various pipe sections are connected in a head-tail coaxial way with the connection sleeve 1704 by hot-melting to form an integral pipeline model. The pipe orifice plugs 1703 located at top and bottom ends of the integral pipeline model need to protrude from a cross section of the pipe, so as to be connected with the pipeline departure angle control mechanism and the anchor end connection mechanism respectively, and convenient for disassembly, assembly and replacement.

Because different scale ratios are selected, other materials other than polypropylene may be selected to manufacture the pipe, the pipe orifice plug 1703 and the connection sleeve 1704, and other materials other than stainless steel, such as graphite powder, may also be selected as the powder.

An experimental method of the reduced-scale model experimental device of the coupling responses in the deep-water J-lay operation comprises the following steps of:

- first step: arrangement of above-water part: moving the pipe-laying ship model 1 into the water tank to be connected with the horizontal mooring mechanism, respectively controlling four mooring line adjustment units to gradually tighten the horizontal mooring lines after the pipe-laying ship model 1 is stable until the pipe-laying ship model 1 moves to specified coordinates and the mooring line tension sensors 6 read specified pre-tensions after being stable, and calibrating a motion coordinate system of the pipe-laying ship model 1 through the six-degree-of-freedom motion sensor 2;
- second step: carrying out of pipe-laying ship motion experiment: making waves in the water tank after the above-water part is arranged and still water is restored, and recording a six-degree-of-freedom motion of the pipe-laying ship model 1 and tension changes of four horizontal mooring lines; and respectively making various preset groups of regular waves with different wave height and period combinations and irregular waves with different significant wave height and spectral peak period combinations in sequence, and comparing system dynamic responses under different sea conditions;

third step: arrangement of underwater part: after all experimental conditions of the pipe-laying ship motion experiment are finished, on the premise of keeping the position of the pipe-laying ship model 1 and the tensions of the horizontal mooring lines unchanged, connecting the deep-water pipeline model 17 with the pipe-laying ship model 1 through the pipeline departure angle control mechanism, then connecting with the seabed simulation mechanism through the anchor end connection mechanism, lowering the seabed simulation mechanism to the specific position on the bottom surface of the interior of the water tank and adjusting a posture of the seabed simulation mechanism through the pull ropes 27, and adjusting a pipeline top end departure angle by remotely controlling the pipeline departure angle control mechanism, so as to ensure that the pipeline top end tension sensor 15 and the pipeline bottom end tension sensor 6 read predetermined values after the system is stable, wherein the pipeline model is ensured to be not subjected to structural damages such as yield, fracture and plastic deformation in the process;

fourth step: carrying out of coupling response experiment: after the underwater part is arranged and still water is restored, making waves in the water tank, recording the six-degree-of-freedom motion of the pipe-laying ship model 1, the tension changes of four horizontal mooring lines, and tension changes of top and bottom ends of the pipeline model under a full coupling condition, and acquiring a motion condition of a marked point near the touch-down point of the pipeline model within an underwater camera shooting range by an image recognition technology; and respectively making regular waves and irregular waves with the same parameters as those in the second step in sequence, and comparing coupling system dynamic responses under different sea conditions;

fifth step: changing the pipeline top end departure angle to other preset angles through the pipeline departure angle control mechanism, and repeating the fourth step to simulate the coupling system dynamic responses under different pipeline departure angles; and sixth step: adjusting a wave-approach direction of the pipe-laying ship model 1 to other preset angles through the mooring line adjustment unit, and repeating the first step to the fifth step to simulate the system dynamic responses under different wave-approach directions.

ONE EMBODIMENT OF EXPERIMENT

The experimental water depth is 10 m, the scale ratio of the model to the real pipeline is 1:50, and the pipeline top end departure angle is 80°.

Parameters of the pipe-laying ship model 1 are as follows:

| Parameter | Real ship | Model |
|---|---|---|
| Length of upper floating body (m) | 180 | 3.6 |
| Width of upper floating body (m) | 98 | 1.96 |
| Height of upper floating body (m) | 12 | 0.24 |
| Height of main deck (m) | 48 | 0.96 |
| Height of lower deck (m) | 36 | 0.72 |
| Length of lower floating body (m) | 180 | 3.6 |
| Width of lower floating body (m) | 35 | 0.7 |
| Height of lower floating body (m) | 12.5 | 0.25 |
| Draft of full-load pipe laying (m) | 25 | 0.50 |
| Displacement (t) | 214160.9 | 1.6715 |

Parameters of the deep-water pipeline model 17 are as follows:

| Parameter | Unit | Real-object | Model |
|---|---|---|---|
| Length | m | 725 | 14.5 |
| Outer diameter | m | 0.4247 | 0.0076 |
| Underwater wet weight | kg/m | 158.5130 | 0.0619 |
| Axial stiffness | N | $3.4004*10^9$ | $2.6540*10^4$ |
| Bending stiffness | Nm2 | $4.0147*10^7$ | 0.1407 |

Experimental conditions of regular waves for the experiment are as follows:

| Wave height (m) | | Period (s) | | Wave direction (deg) |
|---|---|---|---|---|
| Real ship | Model | Real ship | Model | Real ship/model |
| 0.9 | 0.018 | 5.37 | 0.76 | 90, 135, 180 |
| 1.8 | 0.036 | 7.59 | 1.07 | 90, 135, 180 |
| 2.7 | 0.054 | 9.30 | 1.32 | 90, 135, 180 |
| 3.6 | 0.072 | 10.74 | 1.52 | 90, 135, 180 |
| 4.5 | 0.09 | 12.00 | 1.70 | 90, 135, 180 |
| 5.4 | 0.108 | 13.15 | 1.86 | 90, 135, 180 |
| 6.3 | 0.126 | 14.20 | 2.01 | 90, 135, 180 |
| 7.2 | 0.144 | 15.18 | 2.15 | 90, 135, 180 |
| 8.1 | 0.162 | 16.11 | 2.28 | 90, 135, 180 |
| 9.0 | 0.18 | 16.98 | 2.40 | 90, 135, 180 |

Experimental conditions of irregular waves for the experiment are as follows:

| Significant wave height (m) | | Spectral peak period (s) | | Wave direction (deg) |
|---|---|---|---|---|
| Real ship | Model | Real ship | Model | Real ship/model |
| 2.5 | 0.05 | 9.90 | 1.40 | 90, 135, 180 |
| 3.5 | 0.07 | 9.90 | 1.40 | 90, 135, 180 |
| 3.5 | 0.07 | 12.01 | 1.70 | 90, 135, 180 |
| 3.5 | 0.07 | 14.48 | 2.05 | 90, 135, 180 |

Figure 7:
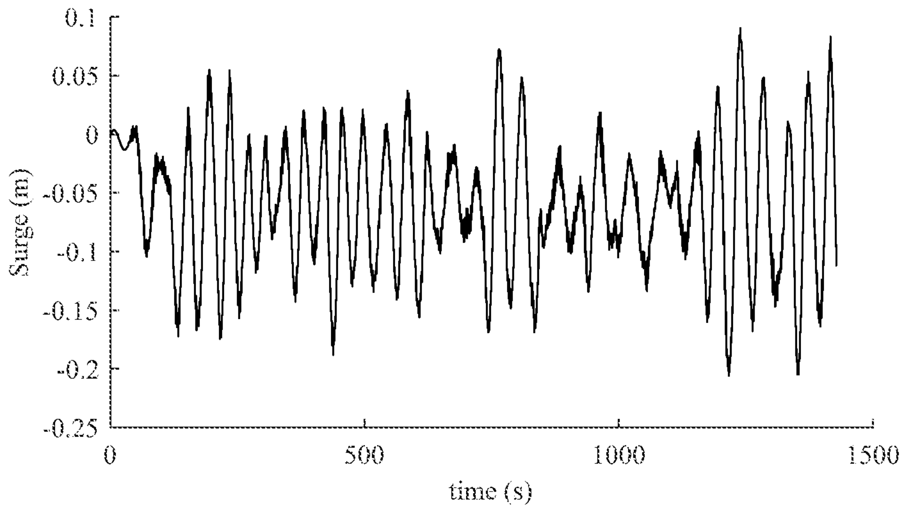
FIG. 7 is a graph showing a change of surge of a pipe-laying ship model with time detected by a six-degree-of-freedom motion sensor under a coupling condition in irregular waves with a significant wave height of 0.07 m and a spectral peak period of 2.05 seconds.
Figure 8:
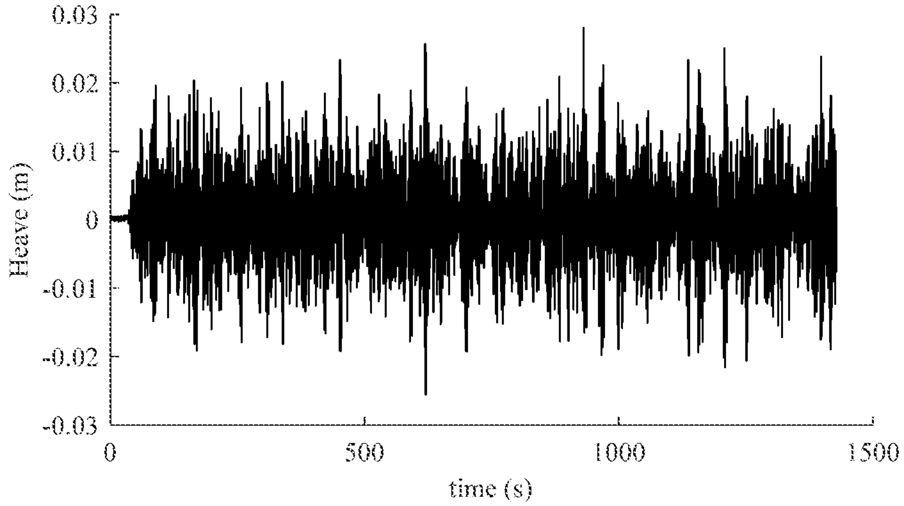
FIG. 8 is a graph showing a change of surge of the pipe-laying ship model with time detected by a six-degree-of-freedom motion sensor under a coupling condition in irregular waves with a significant wave height of 0.07 m and a spectral peak period of 2.05 seconds.
Figure 9:
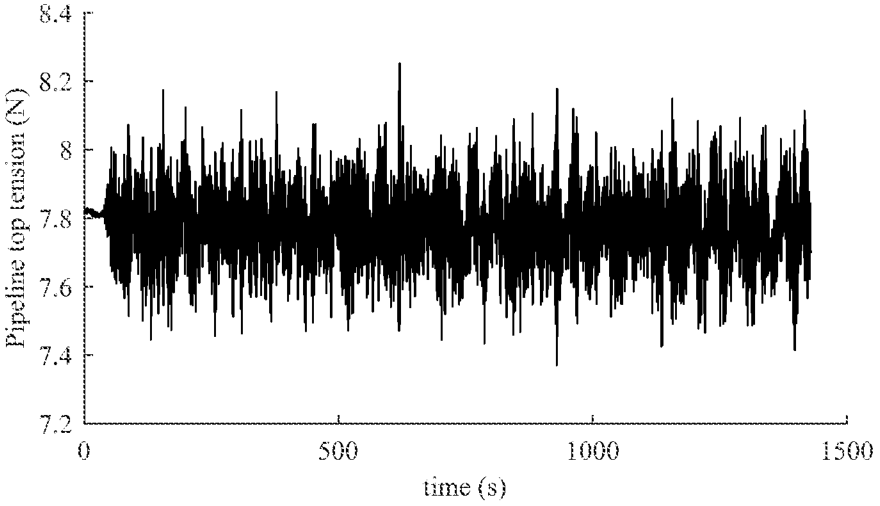
FIG. 9 is a graph showing a change of top end tension of the pipeline model with time detected by a top end tension sensor under a coupling condition in irregular waves with a significant wave height of 0.07 m and a spectral peak period of 2.05 seconds.

Surge and heave motions of the pipe-laying ship model and the top end tension of the pipeline model measured by a coupling model of the pipe-laying ship—the pipeline—the seabed in irregular waves with a significant wave height of 0.07 m and a spectral peak period of 2.05 s are respectively shown in FIG. 7, FIG. 8 and FIG. 9. It can be found that there is an obvious correlation between the motion of the pipe-laying ship model and the tension of the pipeline model.

Although the embodiments disclosed in the present invention are as above, the contents described are only the embodiments adopted for the convenience of understanding the present invention, and are not used to limit the present invention. Any person skilled in the art of the present invention can make any modification and change in the form and details of implementation without departing from the spirit and scope of the present invention, but the scope of protection of the patent of the present invention should still be subject to the scope defined in the appended claims.

What is claimed is:

1. A reduced-scale model experimental device of coupling responses in deep-water J-lay operation, comprising a water tank, a seabed simulation mechanism, a deep-water pipeline model, a horizontal mooring mechanism, a pipeline departure angle control mechanism and an anchor end connection mechanism; wherein, a U-shaped trailer frame is mounted above a water tank, two sliding rails are mounted on two sides of the trailer frame in parallel, and a six-degree-of-freedom motion signal receiver is mounted at one end of the trailer frame;

and a pipe-laying ship model floats on a water surface of the water tank, and a six-degree-of-freedom motion sensor corresponding to the six-degree-of-freedom motion signal receiver is mounted on an upper surface of the pipe-laying ship model;

the seabed simulation mechanism is located on a bottom surface of an interior of the water tank;

the pipeline departure angle control mechanism for adjusting an included angle between a top end of the deep-water pipeline model and the pipe-laying ship model is mounted between the top end of the deep-water pipeline model and the pipe-laying ship model, and a bottom end of the deep-water pipeline model is connected with the seabed simulation mechanism through the anchor end connection mechanism; wherein the pipeline departure angle control mechanism comprises a base, a rocker, a connecting rod, a top end tension sensor and a pipeline top end sleeve; a top end of the base is mounted on the pipe-laying ship model, and a push rod motor is mounted at a bottom end of the base; an upper end of the rocker is hinged with a side wall of the base, the tension sensor is mounted at a lower end of the rocker, and a sliding groove is arranged in the middle of the rocker; and the connecting rod is L-shaped, one end of the connecting rod is movably arranged in the sliding groove of the rocker in a length direction of the sliding groove, and the other end of the connecting rod is connected with a push rod of the push rod motor; and the tension sensor is coaxially mounted at an upper end of the pipeline top end sleeve, a lower end of the pipeline top end sleeve is connected with a top end of the deep-water pipeline model; and when the push rod motor drives the connecting rod to make a linear motion through the push rod, the rocker swings to drive the top end of the pipeline model to rotate to a specific angle, thus adjusting the included angle between the top end of the deep-water pipeline model and the pipe-laying ship model;

and the deep-water pipeline model naturally bends under a gravity, a touch-down zone of the deep-water pipeline model is laid on the seabed simulation mechanism, and a yellow fluorescent sticker for marking is mounted on a nearby part of a touch-down point;

and the horizontal mooring mechanism comprises four sets of horizontal mooring assemblies; the four sets of horizontal mooring assemblies are respectively connected to four corners of the pipe-laying ship model;

each set of horizontal mooring assemblies comprises a horizontal mooring line, a mooring line adjustment unit and a mooring line tension sensor; various mooring line adjustment units are horizontally movably mounted on corresponding sliding rails;

and when various mooring line adjustment units move on the corresponding sliding rails, lengths and tail end positions of the horizontal mooring lines are changed, thus adjusting pre-tensions of the mooring lines and a wave-approach angle of the pipe-laying ship model in the water tank.

2. The reduced-scale model experimental device of the coupling responses in the deep-water J-lay operation according to claim 1, wherein:

the horizontal mooring line is formed by sequentially connecting a steel wire, a spring and a nylon cord; one ends of various steel wires are connected with four corners of side walls of the pipe-laying ship model through corresponding mooring line tension sensors; the other ends of various steel wires are connected with one ends of corresponding springs; the other ends of various springs are connected with one ends of corresponding nylon cords; and the other ends of various nylon cords are connected with corresponding mooring line adjustment units.

3. The reduced-scale model experimental device of the coupling responses in the deep-water J-lay operation according to claim 2, wherein:

the mooring line adjustment unit comprises a main body, and three pulleys are mounted on one side of the main body; and the three pulleys are respectively contacted with an upper surface and two side surfaces of the sliding rail; and a brake for fixing the main body and a winch for retracting and releasing the nylon cord are respectively mounted on one side of the main body.

4. The reduced-scale model experimental device of the coupling responses in the deep-water J-lay operation according to claim 1, wherein:

the deep-water pipeline model comprises a polypropylene pipe, an interior of the polypropylene pipe is fully filled with micro-spherical stainless steel powder, and the polypropylene pipe is a straight cylinder; and two ends of the polypropylene pipe are respectively plugged through polypropylene pipe orifice plugs by hot-melting.

5. The reduced-scale model experimental device of the coupling responses in the deep-water J-lay operation according to claim 4, further comprising a polypropylene connection sleeve, wherein, a plurality of polypropylene pipes are provided; and various polypropylene pipes are coaxially connected, and a corresponding connection sleeve is mounted at a joint of two polypropylene pipes by hot-melting.

6. The reduced-scale model experimental device of the coupling responses in the deep-water J-lay operation according to claim 1, wherein:

the seabed simulation mechanism comprises a main frame, a bottom plate, a seabed model, a camera frame, an underwater high-definition binocular camera, a counterweight and a pull rope;

the bottom plate is fixed at a bottom portion of the main frame, and a bottom surface of the bottom plate abuts against the bottom surface of the interior of the water tank;

the seabed model is laid on an upper surface of the bottom plate, and the seabed model is contacted with the touch-down zone of the deep-water pipeline model;

the camera frame is mounted on the main frame and capable of sliding in a length direction of the bottom plate;

the underwater high-definition binocular camera is mounted on the camera frame;

four counterweights are provided, and the four counterweights are respectively mounted on positions on outer sides of four corners of a bottom portion of the main frame; and four pull ropes are provided, and lower ends of the four pull ropes are respectively connected with the four corners of the main frame.

7. The reduced-scale model experimental device of the coupling responses in the deep-water J-lay operation according to claim 6, wherein:

the anchor end connection mechanism comprises a universal joint coupler, an underwater tension sensor and a pipeline bottom end sleeve which are coaxially connected in series in sequence; the universal joint coupler is mounted at a midpoint of a tail end of the upper surface of the bottom plate; and the pipeline bottom end sleeve is coaxially and fixedly connected with the bottom end of the deep-water pipeline model.

8. An experimental method of the reduced-scale model experimental device of the coupling responses in the deep-water J-lay operation according to claim 1, wherein the experimental method comprises the following steps:

(a) arrangement of above-water part: moving the pipe-laying ship model into the water tank to be connected with the horizontal mooring mechanism, respectively controlling four mooring line adjustment units to gradually tighten the horizontal mooring lines after the pipe-laying ship model is stable until the pipe-laying ship model moves to specified coordinates and the mooring line tension sensors read specified pre-tensions after being stable, and calibrating a motion coordinate system of the pipe-laying ship model through the six-degree-of-freedom motion sensor;

(b) carrying out of pipe-laying ship motion experiment: making waves in the water tank after the above-water part is arranged and still water is restored, and recording a six-degree-of-freedom motion of the pipe-laying ship model and tension changes of four horizontal mooring lines; and respectively making various preset groups of regular waves with different wave height and period combinations and irregular waves with different significant wave height and spectral peak period combinations in sequence, and comparing system responses under different sea conditions;

(c) arrangement of underwater part: after all experimental conditions of the pipe-laying ship motion experiment are finished, on the premise of keeping the position of the pipe-laying ship model and the tensions of the horizontal mooring lines unchanged, connecting the deep-water pipeline model with the pipe-laying ship model through the pipeline departure angle control mechanism, then connecting with the seabed simulation mechanism through the anchor end connection mechanism, lowering the seabed simulation mechanism to the specific position on the bottom surface of the interior of the water tank and adjusting a posture of the seabed simulation mechanism through the pull ropes, and adjusting a pipeline top end departure angle by remotely controlling the pipeline departure angle control mechanism, so as to ensure that the pipeline top end tension sensor and the pipeline bottom end tension sensor read predetermined values after the system is stable, wherein the pipeline model is ensured to be not subjected to structural damages such as yield, fracture and plastic deformation in the process;

(d) carrying out of coupling response experiment: after the underwater part is arranged and still water is restored, making waves in the water tank, recording the six-degree-of-freedom motion of the pipe-laying ship model, the tension changes of four horizontal mooring lines, and tension changes of top and bottom ends of the pipeline model under a full coupling condition, and acquiring a motion condition of a marked point near the touch-down point of the pipeline model within an underwater camera shooting range by an image recognition technology; and respectively making regular waves and irregular waves with the same parameters as those in the second step in sequence, and comparing coupling system responses under different sea conditions;

(e) changing the pipeline top end departure angle to other preset angles through the pipeline departure angle control mechanism, and repeating the fourth step to simulate the coupling system responses under different pipeline departure angles; and (f) adjusting a wave-approach direction of the pipe-laying ship model to other preset angles through the mooring line adjustment unit, and repeating the first step to the fifth step to simulate the system responses under different wave-approach directions.

* * * * *